United States Patent [19]

Castagna et al.

[11] Patent Number: 5,075,359

[45] Date of Patent: Dec. 24, 1991

[54] POLYMER ADDITIVE CONCENTRATE

[75] Inventors: Vincent A. Castagna, Linwood, Pa.; Jesse W. Fullerton, Pierson Farm Wilmington, Del.

[73] Assignee: ICI Americas Inc., Wilmington, Del.

[21] Appl. No.: 422,346

[22] Filed: Oct. 16, 1989

[51] Int. Cl.$^5$ .................. C08L 89/00; C08L 91/06
[52] U.S. Cl. .................................. 524/13; 524/115; 524/277
[58] Field of Search .................. 524/13, 115, 277

[56] References Cited

U.S. PATENT DOCUMENTS 4,458,042 7/1984 Epsy ........................ 524/14

FOREIGN PATENT DOCUMENTS 259960 6/1983 European Pat. Off. .

Primary Examiner—Nathan M. Nutter

[57] ABSTRACT

Polymer additive concentrates comprising (a) between about 10 and about 80 weight percent of a polymer additive; (b) between about 2 and about 50 weight percent of an absorbant material which is a consolidated blend of spurted polyolefin pulp treated with a wetting agent, and wood fluff pulp; and (c) between about 5 and about 80 weight percent polymer, possess unexpectedly higher additive loading as well as exhibiting admirable properties when employed in polymers which are extruded into clear films. In addition, a process for manufacturing such concentrates is described.

12 Claims, No Drawings

POLYMER ADDITIVE CONCENTRATE

FIELD OF THE INVENTION

The present invention is directed to a polymer additive concentrate comprising (a) between about 10 and about 80 weight percent of a polymer additive which is a liquid or a pasty, waxy or lubricating solid; (b) between about 2 and about 50 weight percent of an absorbant material which is a consolidated blend of spurted polyolefin pulp treated with a wetting agent, and wood fluff pulp; and (c) between about 5 and about 80 weight percent polymer, wherein said weight percents are based upon the total weight of components (a), (b) and (c). In another aspect, this invention is directed to a method for the production of such a polymer additive concentrate.

BACKGROUND OF THE INVENTION

The incorporation of additives to improve the properties and/or longevity of polymeric materials has long been recognized. Additives which may be typically employed include antifog agents, antistatic agents, antioxidants, plasticizers, UV stabilizers, non-ionic surfactants and the like.

Although certain of such additives may be added during the polymerization process, this approach may prove unsatisfactory for the incorporation of other additives. For example, the efficiency of the polymerization process may be adversely affected by interaction of the additive(s) with the polymerization catalyst, the polymer additive in question may exhibit incompatibility with other additives used in the polymerization process and/or the subsequent treatment of the polymer may be restricted by the presence of the incorporated additive at such an early stage.

Accordingly, for many additives it is necessary to employ a pre-blend of the additive and a thermoplastic polymer which contains a high level of the additive and which can, therefore, serve as a masterbatch or concentrate. The use of a master batch or concentrate is a generally preferred technique, particularly with liquid or pasty additives, as the neat use of additives having such physical form frequently gives rise to dosing problems and often requires special metering pumps or other expensive equipment.

In general, however, it has been found difficult to obtain polymer additive concentrates having an additive concentration in excess of about 10 or 15 percent by weight in the masterbatch, the maximum achievable loading depending upon the nature of the additives incorporated, their slipping properties and (due to differences in the absorption) upon the kind of polymer to be treated.

In order to overcome this problem, European Patent Application 259,960 discloses a means of greatly increasing the percentage of polymer additive in such concentrates by employing a particulate solid, preferably silica, as an absorbant for liquid, paste or waxy low-melting additives. This loaded absorbant is blended with a suitable polymer under conditions such that a super concentrate containing from 15-80 percent by weight of such an additive is formed.

However while the polymer additive concentrates of EP 259,960 will provide masterbatches having greatly increased loads of liquid, paste or waxy additives, certain drawbacks exist with respect to such concentrates. Specifically, when such concentrates are downloaded into polymers which are extruded into clear films, the silica (or other particulate filler) adversely affects the clarity of the final film.

Moreover, while the silica-containing concentrates of such publication will work admirably in opaque extrusions, it would nevertheless be desirable to possess polymer additive concentrates useful in opaque or clear polymers, which concentrates contain increased amounts of additive.

Accordingly, it is an object of this invention to provide a polymer additive concentrate which, when downloaded into polymers which are extruded into clear films, yields films having improved transparency.

It is a further object of this invention to provide a polymer additive concentrate which contains increased amounts of additive.

These objects, along with additional objects, will become more fully apparent from the following description and accompanying Examples.

SUMMARY OF THE INVENTION

This invention is directed to a polymer additive concentrate comprising:

(a) between about 10 and about 80 weight percent of a polymer additive which is selected from the group consisting of liquids, and pasty, waxy and lubricating solids;

(b) between about 2 and about 50 weight percent of an absorbant material which is a consolidated blend of spurted polyolefin pulp treated with a wetting agent, and wood fluff pulp; and (c) between about 5 and about 80 weight percent polymer;

wherein said weight percents are based upon the total weights of components (a), (b) and (c).

In another respect, this invention is directed to a process for producing a polymer additive concentrate, which process comprises the steps of:

(A) mixing together (i) at least one liquid, or pasty, waxy or lubricating solid additive; and (ii) an absorbant material which is a consolidated blend of spurted polyolefin pulp treated with a wetting agent, and wood fluff pulp, using a solids mixing device;

(B) adding to the mixture a powdered polymer and continuing to mix to obtain an essentially homogeneous mixture;

(C) further mixing the mixture under conditions sufficient to cause melting of the polymer: and (D) cooling and sub-dividing the resulting mixture.

DESCRIPTION OF THE PREFERRED EMBODIMENTS

The polymer additive concentrate composition of this invention is comprised of a polymer additive, an absorbant material and polymer.

The polymer additives that can be employed in the concentrate of this invention may vary greatly in physical form and include liquids, and pasty, waxy or low-melting solids or lubricating materials, these additives being of the type which can be used as antifog agents, clarifying agents, antioxidants, U.V. stabilizers, infrared absorbers, biocides, antistatic agents, plasticizers, flame retardants or for any other purpose in which the use of particulate solid additive is difficult or impossible. Specific additives which may be present in the concentrate include polyalkylene glycols; ethoxylated fatty acids, for example the naturally occurring fatty acids such as coconut fatty acid; ethoxylated amines, for example, the synthetic higher alkyl primary amines; esters such as sorbitan monolaurate and glycerol esters; chlorinated paraffin; organic phosphates; organic phosphites such as trinonylphenylphosphite; and U.V. stabilizers such as benzophenone, benzotriazole or hindered amine light stabilizers. Preferred additives include polyethoxylated amines such as diethoxylated amines, a convenient amine of this type being a mixture containing alkyl groups having from 13 to 15 carbon atoms, such amines being used alone or in combination with glycerol fatty acid ester such as glycerol monostearate or monooleate, polyoxylated alcohols, polyethylene glycol and sulphates of alcohols containing a mixture of alkyl groups having from 13 to 15 carbon atoms. A mixture of additives may advantageously be used, for example a mixture of polyethoxylated amine with a glycerol fatty acid ester.

The absorbent material employed in the polymer concentrates of this invention includes those consolidated blends of wetting agent-treated polyolefin pulps and wood fluff pulp described in U.S. Pat. No. 4,458,042, and related materials.

The grades of wood fluff pulp useful in forming these absorbant material, and the methods of their preparation are well known to those skilled in the art. Wood pulp can be obtained via well known chemical processes such as the Kraft and the sulfite processes. For these processes, the preferred starting material is prepared from long fiber coniferous wood species, such as pine, douglas fir, blue fir, spruce, and hemlock. Wood pulp also can be obtained from mechanical processes, such as ground wood, refiner mechanical, thermomechanical, chemimechanical, and chemithermomechanical pulp processes. Details of the production and use of wood pulp are well known to one skilled in the art.

The other component of the absorbent material employed in the concentrates of this invention is treated spurted polyolefin pulp. Spurted polyolefin pulps also are well known in the art. See, e.g. "Pulp, Synthetic", Kirk-Othmer, *Encyclopedia of Chemical Technology*, 3rd ed. (New York: 1982) vol. 19, pp. 420–435.

Spurted polyolefin pulps are very fine, highly branched, discontinuous fibrils made from thermoplastic polymers. Their visual appearance and dimensions closely resemble those of wood pulps. Spurted polyolefin pulps have a large surface area (ca. 3–50 $m^2/g$), low densities (ca 0.2 g/cc as measured by mercury porosimetry for spurted polypropylene and ca 0.4 g/cc for spurted polyethylene), an average length of about 1 mm and an average diameter of about 5–40 microns.

Representative of the polymers from which the spurted polyolefin pulps may be made are polyethylene, polypropylene, copolymers of ethylene and propylene, copolymers of propylene and other 1-olefins such as 1-butene, 4-methyl-pentene-1 and 1-hexene. Also useful are grafted spurted polyolefin pulps in which maleic anhydride or styrene groups are grafted into any of the above polymers. In some embodiments, mixtures of two or more of these polymers may be employed. The preferred spurted polyolefin pulps are those prepared from polyethylene and polypropylene.

The amount of spurted polyolefin pulp to be used in the absorbant material ranges from about 3 to about 30%, based on the total weight of such absorbant material. The optimal amount for a particular blend will depend upon the spurted polyolefin pulp chosen, as well as the properties desired in the final absorbant material.

Generally, as the percentage of spurted polyolefin pulp increases, the strength of the absorbant material also increases.

The spurted polyolefin pulp is treated with a wetting agent. A wetting agent is a surface-active agent which reduces the surface tension of water as water comes into contact with the treated material, thus causing the water to more readily penetrate.

The wetting agent employed typically comprises one or more wetting agents selected from the group of anionic and nonionic wetting agents each having molecular weights of less than about 8,000. Representative wetting agent include polyoxyethylene monostearate ester, bis(hydroxyethyl) tallow amine, sodium dioctyl sulfosuccinate, polyoxyethylene dioleate ester, sodium lauryl sulfate, ethoxylated sorbitan laurate, sodium alkyl sulfonates and the like. Ethoxylated sorbitan laurate and sodium alkyl sulfonates are preferred wetting agents.

The treatment of the spurted polyolefin pulp with the wetting agent may be accomplished via a variety of methods, which methods are well known in the art. One preferred method is to spurt the polyolefin pulp directly into an aqueous solution containing the wetting agent, under which conditions the wetting agent is absorbed onto the surface of the fiber. Other methods include spraying a solution of the wetting agent onto the pulp, or adding the wetting agent to the pulp slurry during the blending process.

The treatment is such that from about 0.05 to about 3%, preferably from about 0.1 to about 1%, based on the weight of the spurted polyolefin pulp, of the wetting agent substance is retained in the spurted polyolefin pulp. The amount of wetting agent substance which is retained on the spurted polyolefin pulp can be controlled by varying the concentration of the wetting agent substance solution used in the treatment or by varying the surface area of the synthetic pulp or by varying both.

The wood pulp and the treated spurted polyolefin pulp may be blended prior to fluffing by several known blending methods, including the preparation of a pulp sheet by conventional paper-making procedures or by conventional dry blending methods. After blending, the spurted polyolefin and wood pulps are fluffed and formed into a fluff pad by conventional methods such as hammermilling or air forming.

Alternatively, the spurted polyolefin and wood pulps may be fluffed prior to blending. The order of fluffing and blending is not critical.

Finally, the fluff pad is consolidated by heating at a temperature and for a time sufficient to fuse the spurted polyolefin pulp. Fusion will occur by raising the temperature of the fluff pad above the spurted polyolefin pulp's melting point. For example, the melting point of some types of spurted polyethylene pulp is 115° C., while the melting point of spurted polypropylene pulp is 160°–165° C. Methods used to fuse the spurted polyolefin pulp are known in the art. Representative methods include the use of calendars, infrared heaters and pull-through driers and the like. Exact conditions, which will be readily ascertained by one skilled in the art, must be determined for the specific blend being use. The time, which will be readily ascertained by one skilled in the art, generally ranges from 1 second to about 10 minutes.

The polymers which comprise the third component of the concentrate of the present invention are thermoplastic in nature. Illustrative of such polymers are polystyrene, high impact polystyrene, a styrene-acrylonitrile copolymer, acrylonitrile-butadiene-styrene copolymers, polymethylmethacrylate, linear low-, low- and high-density polyethylene, vinyl chloride polymers and copolymers, propylene polymers and copolymers, polyesters and other engineering resins such as nylon.

The composition of this invention typically comprises between about 10 and about 80 weight percent, preferably between about 25 and about 70 weight percent, and most preferably between about 40 and about 60 weight percent additive, based upon the total weight of additive, absorbant material and polymer. The absorbant material generally comprises between about 2 and about 50, preferably between about 5 and about 25, and most preferably between about 10 and about 20 weight percent of the composition. Typically, the polymer content will range between about 5 and about 80 weight percent, preferably between about 10 and about 70 weight percent, and most preferably between about 20 and about 50 weight percent of the concentrate. It will be understood, however, that the optimum concentration of components of any particular concentrate will vary in accordance with the particular additives, polymers, absorbant material, end uses, etc., involved. Nevertheless, one of ordinary skill could easily determine the optimum concentration for any specific concentrate employing routine experimentation.

The concentrate may be downloaded by blending into polymer to yield either a masterbatch composition or a desired final composition. The concentrate can be so incorporated into polymer using known compounding machines for polymeric materials such as, for example, a Banbury mixer or, particularly, an extruder. The concentrate and the polymeric material may be added to the compounding machine separately at rates to give the desired level of additive in the masterbatch or final compounded polymer which is to be produced.

The concentrate of the present invention is a compounded polymer concentrate in the form of free flowing granules having a high content of liquid, pasty, waxy or lubricating additive. The granules of the concentrate are typically non-bridging and have a regular flow rate.

The production of the concentrate is a further feature of the present invention.

Thus, according to a further aspect of the present invention there is provided a process for providing a polymer additive concentrate, which process comprises:

(A) mixing together (i) at least one liquid, pasty, waxy or lubricating additive; and (ii) an absorbant material which is a consolidated blend of spurted polyolefin pulp treated with a wetting agent, and wood fluff pulp, using a solids mixing device;

(B) adding to the mixture a powdered polymer and continuing to mix to obtain an essentially homogeneous mixture;

(C) further mixing the mixture under conditions sufficient to cause melting of the polymer; and (D) cooling and sub-dividing the resulting mixture.

The mixing in steps (A) and (B) is very conveniently effected using the same apparatus. Any solids mixing device may be used. The mixing may be effected at a slow speed, for example at 30 to 60 r.p.m., for example using a Hobart mixer. Alternatively, mixing can be effected at a high speed, typically in excess of 500 r.p.m., for example 1500 r.p.m., using a high speed mixer such as a Henschel mixer or an Ital high speed mixer.

In step (A), the additive, or mixture of additives, is added to the absorbant material at a rate such that a free flowing powder mixture is obtained. The rate of addition of the additive or additive mixture is dependent on the speed of mixing, the type and proportion of additive or additive mixture, the nature of the absorbant material and the quantity of materials which are being mixed together. In general, if mixing is effected at a speed of 30 to 60 r.p.m. effective mixing of the additive, or additive mixture, and the absorbant material can be attained in a time of 30 seconds using up to about 100g of materials. If mixing is effected at a speed in excess of 500 r.p.m., a mixing time of less than two minutes is generally sufficient and, at higher speeds, shorter times of less than one minute, for example as little as 20 seconds, may be used. However, it will be appreciated that the time of mixing is dependent at least to some extent on the total quantity of materials being mixed together, larger quantities requiring longer times to achieve effective mixing.

In step (B) a powdered polymer is added to the premixed additive, or additive mixture, and absorbant material. The powdered polymer is conveniently added under the same agitation conditions employed in step (A). Typcially, using the same agitation conditions in step (A) and step (B), the time of addition of the polymer, and/or total agitation time to obtain an essentially homogeneous mixture, is not more than the time required to achieve effective mixing in step (A). In general the time of mixing in step (B) is substantially less than the time of mixing in step (A), for example 75% of the time in step (A) or even 60%, or less of the time of step (A).

It will be appreciated that steps (A) and (B) can be effected in a continuous manner by adding the various components, in succession, to an appropriate solids mixing device.

Steps (C) and (D) are also conveniently effected in a continuous manner, for example by the use of an extruder feeding, a granulating device or an intensive mixer such as a Banbury mixer which produces a sheet which is passed to a cutting device to form granules. The mixing in step (C) may be effected with heating, but it will be appreciated that many mixing procedures themselves generate substantial heat such that it may be possible to omit the addition of heat by other means.

The temperature attained during step (C) should be sufficient to effect melting of the polymer. The additive, or mixture of additives, used should be stable at the temperature of step (C), at least for the period for which this temperature is maintained, and also the temperature of any subsequent stage in which the mixture is subjected to an elevated temperature, for example when forming the final polymer composition. The temperature of step (C) will be dependent upon the particular polymer used and for many polymers will be at least about 150° C. and may be 200° C. or even higher.

Step (C) is effected for a relatively short time which is dependent to some extent on the total amount of mixture being processed and the nature of the polymer being used and may be as short as 20 seconds or less or as long as ten minutes or more.

In step (D), the mixture is allowed to cool to allow at least a partial solidification of the polymer. Conveniently, using an extruder, the master-batch mixture is withdrawn from the extruder die as one or more laces which are passed into a water bath and thereafter granulated. Procedures for melting and granulating polymer mixtures are well known and any suitable procedure may be used to effect stages (C) and (D).

The polymer which is used in step (B) must be in the form of a powder, that is a material with average particle dimensions less than one mm. Granules, pellets or diced polymer, all of which are typically obtained by melting a polymer and then sub-dividing the polymer after it has at least partially re-solidified, are generally not appropriate for the purpose of the invention since such materials frequently are of a particle size which is too large to be useful in the process of the present invention. Some polymers such as low density polyethylene obtained at high pressure using a free radical initiator, may be obtained as granules from which powder can be obtained by grinding.

The polymer used in step (B) is very preferably of the same type as the polymer with which the concentrate is to be blended. However, the polymers need not be the same provided that, in the blend of the polymer and concentrate, two distinct polymer phases do not result.

It is also within the scope of this invention to first blend the absorbant material with the polymer, and then subsequently blend in the additive, as described in the Examples below.

EXAMPLES

The following Examples are intended to further illustrate the present invention and are not intended to limit the scope of the invention in any manner whatsoever.

EXAMPLE 1 AND COMPARATIVE EXPERIMENT A

In order to demonstrate the increased loading capacity of the polymer concentrates of this invention vis-a-vis polymer concentrates comprising the silica absorbant preferentially employed in European Patent Application 259,960, the following experiment was conducted.

To 25 grams of a consolidated blend of spurted wetting agent treated-polypropylene/wood pulp (Pulpex ® P-AD, Hercules Incorporated) (Example 1) and 25 grams of absorbant silica (22 Supernat, North American Silicone Corp.) (Comparative Experiment A), respectively, were added 25 grams of polypropylene resin (Profax 6301, Himont). The blends were mixed using a KitchenAid mixer at number 1 speed until a uniform mixture was achieved (approximately 1 minute). The mixtures were agitated and a blend of ethoxylated nonylphenol and sorbitan monolaurate, a liquid wetting agent composition (polymer additive), was metered in until saturation (indicated by visible caking) occurred. It was found that saturation occurred in Example 1 after the addition of 90 grams of such liquid polymer additive whereas saturation of the silica-containing composition of Comparative Experiment A occurred after the addition of only 35 grams of the ethoxylated nonylphenol/sorbitan monolaurate blend.

This example demonstrates the unexpectedly increased loading of the additive concentrates of this invention relative to prior polymer additive concentrate compositions.

EXAMPLE 2 AND COMPARATIVE EXPERIMENT B

Employing a procedure essentially identical to that employed in Example 1, preblends of 25 parts of polypropylene resin (Profax 6301, Himont) with: 25 parts of Pulpex P-AD (Example 2), and with 25 parts absorbant silica (22 Supernat) (Comparative Experiment B) were prepared. To each such preblend, 50 parts of a blend of ethoxylated nonylphenol and sorbitan monolaurate were incorporated while mixing was continued until the polymer melted. The mixture was allowed to cool, thereby forming polymer additive concentrates.

Each of such concentrates were blended with neat polypropylene resin (Profax 6301) in a 1:100 concentrate:resin ratio by weight, using a Kitchen-Aid mixer set on speed number 1 for about 3 minutes.

The resultant blend was introduced into a Braebender and extruded into a film about 3 mils in diameter. The silica-containing film possessed a rough surface with significantly visible haze. In contrast, the film produced employing the polymer additive concentrate of this invention possessed a smooth surface with greatly reduced haze.

In order to quantify the clarity of such films, the percent of haze of each was determined employing a Hazequard analyzer. It was found that the film induced employing the silica-containing concentrate possessed 21% haze where the film produced employing the spurted pulp-containing concentrate exhibited 17.6% haze.

This Example shows that the concentrates of this invention, unlike silica-containing concentrates, are admirably employed in polymers for clear film end uses.

What is claimed is:

1. A polymer additive concentrate comprising:
   (A) between about 10 and about 80 weight percent of a liquid polymer additive;
   (B) between about 2 and about 50 weight percent of, an absorbant material which is a consolidated blend of spurted polyolefin pulp treated with a wetting agent, and wood fluff pulp; and
   (C) between about 5 and about 80 weight percent thermoplastic polymer; wherein said weight percents are based upon the total weights of components (a), (b) and (c).

2. A concentrate in accordance with claim 1 wherein component (a) comprises between about 25 and about 70 weight percent; component (b) comprises between about 5 and about 25 weight percent, and component (c) comprises between about 10 and about 70 weight percent, of the combined total weight of components (a), (b) and (c).

3. A concentrate in accordance with claim 2 wherein component (a) comprises between about 40 and about 60, weight percent; component (b) comprises between about 10 and about 20 weight percent; and component (c) comprises between about 20 and about 50 weight percent, of the combined total weight of components (a), (b) and (c).

4. A concentrate in accordance with claim 1 wherein component (a) is selected from the group consisting of polyalkylene glycols, ethoxylated fatty acids, ethoxylated amines, esters, chlorinated paraffins, organic phosphites, organic phosphates, U.V. stabilizers and infrared absorbers.

5. A concentrate in accordance with claim 1 wherein component (c) is selected from the group consisting of polystyrene, high impact polystyrene, styrene-acrylonitrile copolymer, acrylonitrile-butadiene-styrene copolymer, ethylene polymer and copolymers, vinyl chloride polymer and copolymer, propylene polymer and copolymer, and engineering resins.

6. A concentrate in accordance with claim 1 wherein component (b) comprises a spurted polyethylene pulp.

7. A concentrate in accordance with claim 1 wherein component (b) comprises a spurted polypropylene pulp.

8. A process for producing a polymer additive concentrate, which process comprises the steps of:

(A) mixing together (i) at least one liquid additive; and (ii) an absorbent material which is a consolidated blend of spurted polyolefin pulp treated with a wetting agent, and wood fluff pulp, using a solids mixing device;

(B) adding to the mixture a powdered thermoplastic polymer and continuing to mix to obtain an essentially homogeneous mixture;

(C) furthering mixing the mixture under conditions sufficient to cause melting of the polymer; and (D) cooling and sub-dividing the resulting mixture.

9. A process in accordance with claim 8 wherein steps (A) and (B) are effected using the same apparatus.

10. A process in accordance with claim 9 wherein step (C) is effected in an extruder or intensive mixer.

11. A process in accordance with claim 10 wherein the intensive mixing is effected with heating.

12. A process in accordance with claim 8 wherein in step (C) the mixture is obtained as a polymer lace, which is cooled in a water bath and granulated.

* * * * *